(12) United States Patent
Albright et al.

(10) Patent No.: US 6,910,731 B2
(45) Date of Patent: Jun. 28, 2005

(54) SKID STEER LOADER WITH FRONT PIVOTING CAB HAVING A NO TOOL LATCH

(75) Inventors: Larry E. Albright, Gwinner, ND (US); James E. Asche, Gwinner, ND (US); Lance S. Tuhy, Fargo, ND (US); Jon P. Spomer, Bismarck, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 120 days.

(21) Appl. No.: 10/326,027

(22) Filed: Dec. 19, 2002

(65) Prior Publication Data

US 2004/0119320 A1 Jun. 24, 2004

(51) Int. Cl.[7] .................. B62D 33/067; B62D 33/07
(52) U.S. Cl. .................. 296/190.05; 296/190.06; 180/89.16
(58) Field of Search .......... 296/190.01, 190.03–190.06, 296/190.08; 180/89.12, 89.13, 89.14, 89.16, 89.17, 89.18, 89.19

(56) References Cited

U.S. PATENT DOCUMENTS

| | | | |
|---|---|---|---|
| 286,515 A | 3/1928 | Newton | |
| 2,193,112 A | 3/1940 | Peterson | |
| 2,502,622 A | 4/1950 | Harris | |
| 2,947,376 A | 8/1960 | Norrie | |
| 3,051,259 A | 8/1962 | Lorenz | |
| 3,184,262 A | 5/1965 | Mintz | |
| 3,281,176 A | 10/1966 | McKey | |
| 3,288,237 A | 11/1966 | Moller | |
| 3,380,773 A | 4/1968 | Sewelin | |
| 3,390,914 A | 7/1968 | Sewelin | |
| 3,393,005 A | 7/1968 | Herrmann et al. | |
| 3,560,038 A | 2/1971 | Gunther | |
| 3,572,797 A | 3/1971 | Shay | |

(Continued)

FOREIGN PATENT DOCUMENTS

| | | |
|---|---|---|
| DE | 30 27 425 A | 4/1981 |
| DE | 678 544 A | 9/1991 |
| DE | 296 06 645 U | 6/1996 |
| GB | 1 042 765 A | 9/1966 |

*Primary Examiner*—D. Glenn Dayoan
*Assistant Examiner*—Greg Blankenship
(74) *Attorney, Agent, or Firm*—Westman, Champlin & Kelly, P.A.

(57) ABSTRACT

A skid steer loader has an operator's cab mounted thereon pivoting about a horizontal pivot adjacent a forward edge of the frame of the loader and at the forward edge of the operator's cab. In a working position the cab overlies a portion of the frame that has operating components therein, and the cab can be pivoted to raise the rear of the cab to pivot it forwardly to an open position to permit access to components beneath the cab when its in its working position. The cab has positive latches for holding it in its working position, and an automatic stop to hold it in its open position. The latches are operated by levers on the back wall of the cab that are moved between a latched and unlatched position, and when they are in their unlatched position, a cover for the engine components cannot be closed.

11 Claims, 15 Drawing Sheets

U.S. PATENT DOCUMENTS

| | | |
|---|---|---|
| 3,582,132 A | 6/1971 | Gunning |
| 3,924,702 A | 12/1975 | Heggen |
| 3,985,194 A | 10/1976 | Knutson |
| 4,026,380 A | 5/1977 | Blomstrom |
| 4,061,393 A | 12/1977 | Blomstrom |
| 4,078,779 A | 3/1978 | Molders |
| 4,114,718 A | 9/1978 | Lipshield |
| 4,225,004 A | 9/1980 | Lipshield |
| 4,225,176 A * | 9/1980 | Moser .................. 296/190.01 |
| 4,304,142 A * | 12/1981 | Blomstrom .............. 180/89.15 |
| 4,362,220 A | 12/1982 | Baston |
| 4,401,179 A | 8/1983 | Anderson |
| 4,405,280 A | 9/1983 | Cochran et al. |
| 4,408,672 A | 10/1983 | Albright et al. |
| 4,411,332 A * | 10/1983 | Eichelsheim ............. 180/89.14 |
| 4,413,696 A * | 11/1983 | Slocombe et al. ....... 180/89.14 |
| 4,438,826 A * | 3/1984 | Bewers .................... 180/89.14 |
| 4,440,437 A | 4/1984 | Hahm et al. |
| 4,669,565 A * | 6/1987 | Miki et al. ............... 180/89.12 |
| 4,690,232 A | 9/1987 | Schulz |
| 4,811,983 A | 3/1989 | Watts et al. |
| 4,815,550 A | 3/1989 | Mather et al. |
| 5,024,283 A | 6/1991 | Deli |
| 5,042,835 A | 8/1991 | Burns |
| 5,071,180 A | 12/1991 | Wiedehage et al. |
| 5,398,774 A * | 3/1995 | Nilsson et al. ........... 180/89.14 |
| 5,520,500 A * | 5/1996 | McIlwain et al. ........ 180/89.19 |
| 5,524,722 A * | 6/1996 | Bowman et al. ......... 180/89.17 |
| 5,538,097 A | 7/1996 | Stauffer et al. |
| 5,547,244 A | 8/1996 | Lee |
| 5,551,826 A | 9/1996 | Todd et al. |
| 5,791,428 A | 8/1998 | Noll et al. |
| 5,941,330 A | 8/1999 | Miller et al. |
| 5,971,434 A | 10/1999 | Neufeld et al. |
| 5,992,550 A | 11/1999 | Gronlund |
| 6,048,018 A | 4/2000 | Shambeau et al. |
| 6,102,471 A | 8/2000 | Sasser et al. |
| 6,167,977 B1 | 1/2001 | Adamson et al. |
| 6,213,235 B1 | 4/2001 | Elhardt et al. |
| 6,357,820 B1 * | 3/2002 | Nagatsuka et al. .... 296/190.06 |
| 6,543,563 B1 * | 4/2003 | Muraro .................... 180/89.12 |
| 6,572,179 B2 * | 6/2003 | Dahl et al. ............. 296/190.08 |

* cited by examiner

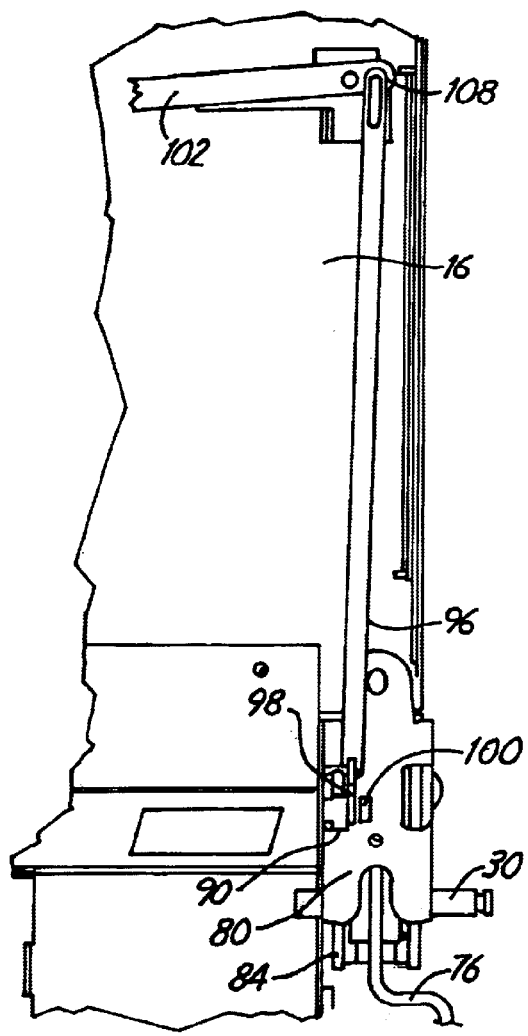
Fig. 14
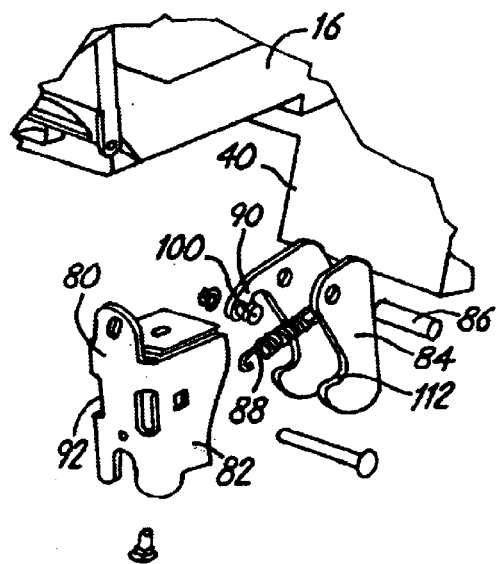
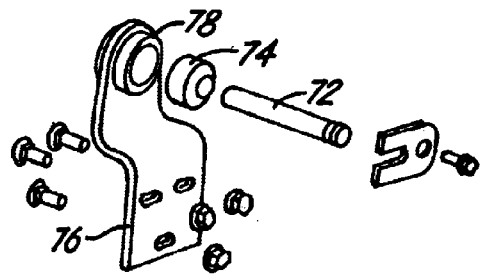
Fig. 15

SKID STEER LOADER WITH FRONT PIVOTING CAB HAVING A NO TOOL LATCH

BACKGROUND OF THE INVENTION

The present invention relates to a skid steer loader with a forwardly pivoting operator's cab for providing access to components beneath the cab and in the engine compartment. The cab includes a dropped foot pod, and a no tool latch to hold the cab in working position. A stop for holding the cab in its open position is provided.

Power equipment with cabs that will move out of the way for access to power components installed below the cab are well known. Some cabs are completely removable, and some cabs pivot rearwardly, such as those used on the BOBCAT loader made by the Bobcat Company unit of Ingersoll-Rand Company. Cabs which pivot near the top at the rear also have been advanced, such as that shown in U.S. Pat. No. 5,941,330. Forward pivoting cabs on skid steer loaders have been used, as shown in U.S. Pat. No. 5,551,826, where the entire lift arm control linkage moves with the cab, making it quite heavy for pivoting.

A loader cab which simply pivots forwardly for access to components below the cab is illustrated in U.S. Pat. No. 4,401,179.

The space consumed by the cab and cab mounting is of great importance in skid steer loader because the maneuverability of the loaders is dependent upon a small size and short wheel base so that the loader can turn in a short radius and maneuver in small areas. Thus, saving space in the operator's cab is of great importance as well, but it is desirable to provide easy access to hydraulic components and other components that are mounted on the loader frame below the cab.

SUMMARY OF THE INVENTION

The present invention relates to a skid steer loader that has a cab pivoted to a unitary rigid loader frame at the front of the cab and wherein the cab pivots forwardly. In the present invention, the operator's cab is formed with a dropped, separate foot compartment or pod that forms only a forward portion of the cab. The foot pod is dropped below the level of the floor of the cab that supports the seat for the operator. The foot compartment or pod fits between the side walls of the loader frame, and reduces the center of gravity by eliminating the need for having the seat raised sufficiently so that the operator's feet can rest on a floor above the frame.

The foot compartment or pod is just above the front axle of the loader when the cab is in operable position, and with a forward pivoting cab, the foot compartment or pod will pivot out of the way as well, depending on the placement of the pivot. The loader arms are formed to permit the forward pivoting.

The cab is positively latched in its working position, and the latch has release levers that are manually operable to release the latch to permit lifting the rear of the cab and pivoting it forwardly. The latch requires no wrenches or tools to operate. In order to hold the cab in its open position, after forward pivoting, an automatic cab stop will hold the cab in open position, but the cab stop requires manual movement for releasing the stop for permitting the cab to return to its working position. The cab stop includes a pivoting lever mounted on a fender at the top portions of the loader frame, or side panel. The lever has a slot extending along its length with a pin secured to the cab being slidable in this slot. A laterally extending recess open to the slot receives the pin when the cab is pivoted to its full open position to prevent reverse pivoting of the cab until the stop is released.

When the cab is in its working position, the pin on the cab itself is positioned in an end of the slot adjacent to the lever pivot. As the cab is pivoted forwardly, the pin rides in the slot causing the lever to pivot, and when the cab reaches its full open position, the pin moves into the lateral recess. The pin cannot reverse direction until the lever is moved so the pin is no longer in the recess. This movement of the lever requires manual operation by the operator, and once the lever is moved to its released position, the cab can return to its working position.

The cab weight can be resisted by gas springs that resist rapid movement of the cab to its operating position, to avoid slamming the cab into its home location. A cab latch is provided at each of the rear corners of the cab and each has a latch dog that is manually engaged with a pin secured to the loader frame. A lever is manually moved to release and secure the respective latch. The lever is mounted on a rear wall of the cab, and when the cab reaches its down or working position, the levers can be manually closed.

When the latches are released, the latch operating levers will, protrude upwardly adjacent a forward edge of a cover that extends over the engine compartment and engine components, and if the latch levers are not closed, the engine compartment cover cannot be closed either. This serves as a reminder to make sure the cab is secured before operating the loader.

BRIEF DESCRIPTION OF THE DRAWINGS

FIG. 14 is a rear view of the cab latch and the operating lever of FIG. 13;

FIG. 15 is an exploded perspective view of the cab latch shown in FIGS. 10–14.

DETAILED DESCRIPTION OF THE PREFERRED EMBODIMENTS

Figure 1:
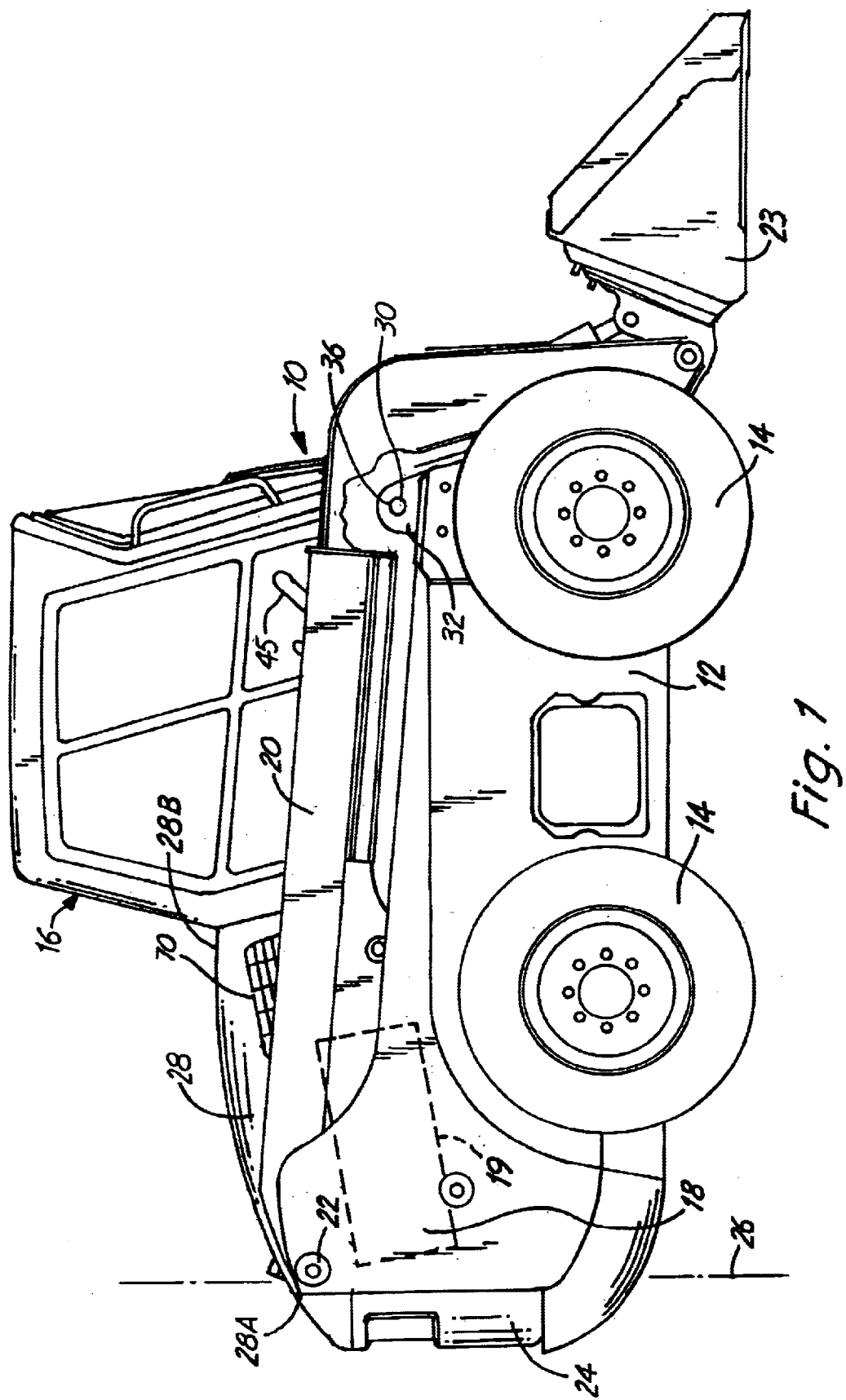
FIG. 1 is a side elevational view of a skid steer loader having an operator's cab made according to the present invention mounted thereon.

A skid steer loader indicated generally at 10 has a main assembly frame 12, and drive and support wheels 14, 14 mounted on axles supported on the frame. Power supplied is by an engine 19 that powers a hydraulic pump, for driving the drive wheels in a normal manner using hydraulic motors. The frame 12 has side frame uprights 18 that pivotally support a lift arm assembly 20 for pivoting about a pivot 22 between raised and lowered positions. Hydraulic actuators 17 (FIG. 2) are used for raising and lowering the lift arms, and the lift arms are made so that they fit on opposite sides of a cab 16. As shown, the lift arms are telescoping lift arms that can extend forwardly from the frame, but fixed length lift arms also can be used. A conventional bucket 23 can be used with the lift arms.

Figure 2:
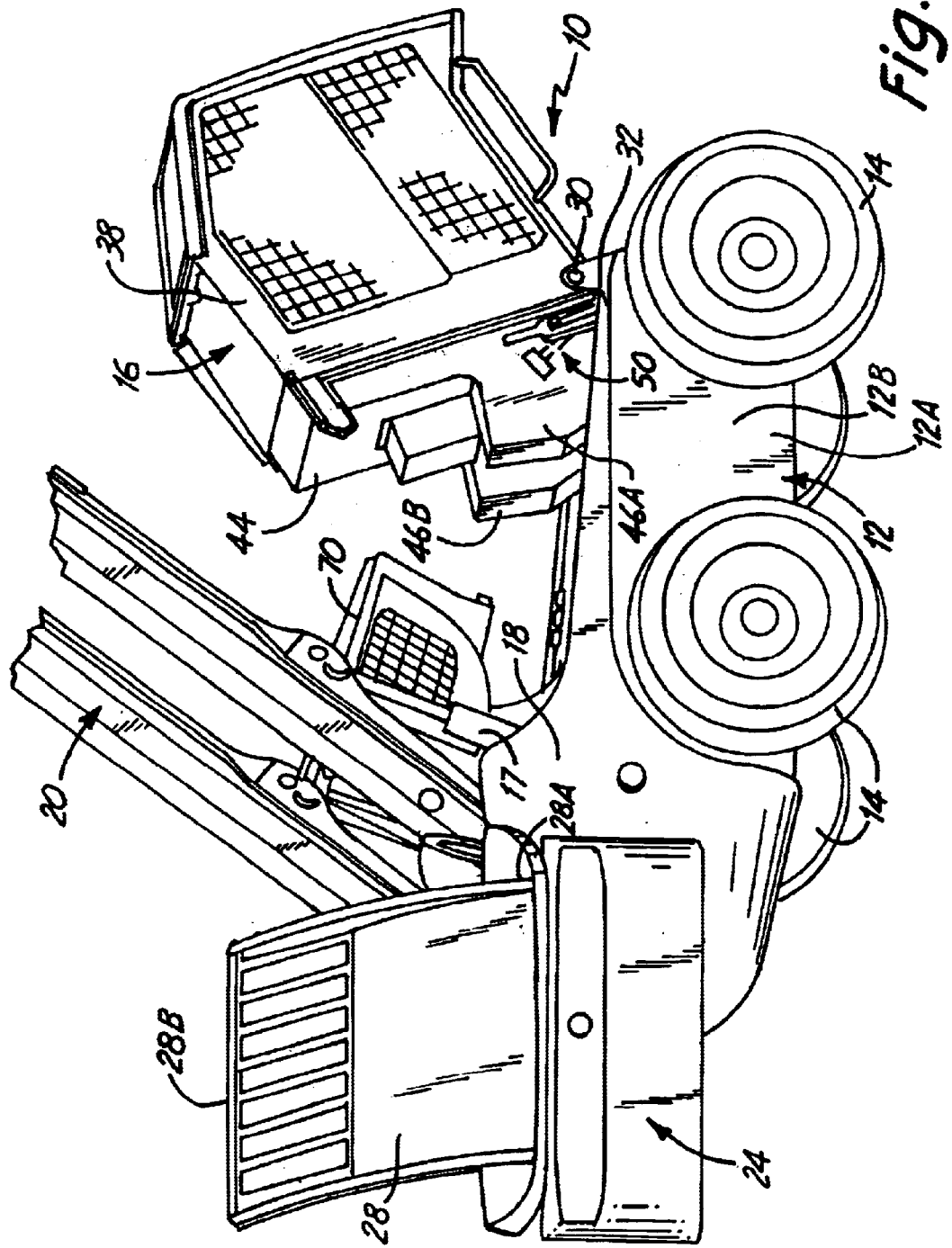
FIG. 2 is a perspective view of the loader with lift arms raised, and the cab and the engine compartment cover open, and a package of engine components raised.
Figure 3:
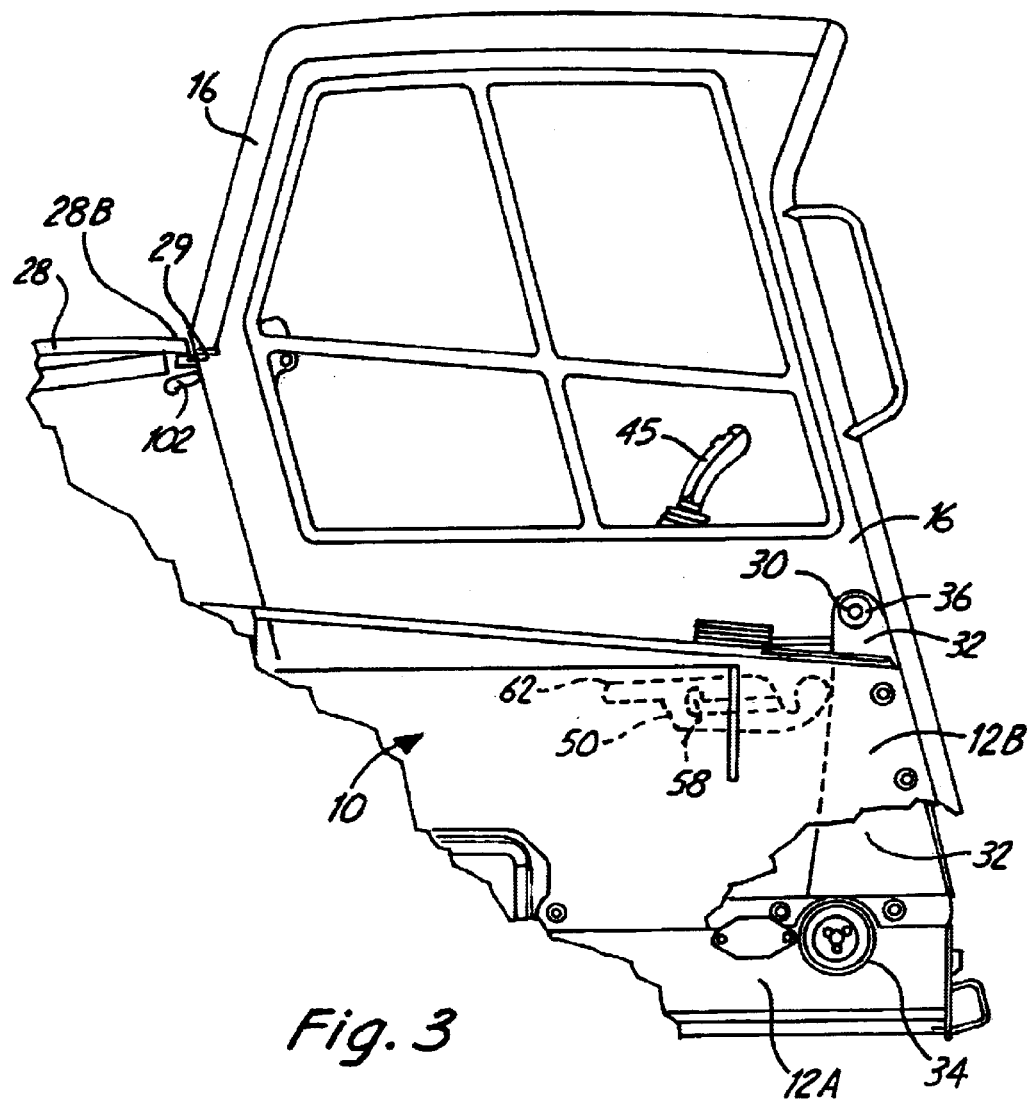
FIG. 3 is a fragmentary side schematic elevational view of a forward portion of the skid steer loader frame showing the mounting for the operator's cab.

The frame 12 has a tailgate assembly 24 which is pivoted about an upright pivot shown as a pivot axis 26. The tailgate can swing open as shown in FIG. 2 for servicing the engine and components. The tailgate carries an engine cover 28 that is pivoted about a horizontal axis to the tailgate. The details of construction of the pivoting tailgate and engine cover assembly are more fully disclosed in U.S. patent application Ser. No. 10/123,469, filed Apr. 15, 2002. The engine cover if hinged at a rear edge 28A and the forward edge 28B can be raised to permit access to components in a compartment just to the rear of the cab. The front edge 28B of cover 28 will latch closed with a latch 29 centered on the rear wall of the cab.

The cab 16 is mounted to main frame assembly 12 adjacent the front lower corners for pivoting about the horizontal axis of pivot pins 30. There is one support pin on each side of the cab 16. The cab 16 is shown pivoted forwardly in FIG. 2. As shown, the cab is supported on sturdy uprights 32 on each forward corner of the frame. The uprights are supported directly to a base frame portion 12A that directly supports axle tubes 34. The uprights extend on the inside of an outer frame member or fender structure 12B, which also has the upright frame supports 18 for the lift arms. The frame or fender portion extend along the sides of the lower portion of the cab 16.

The pivot pin for the cab is fixed to the cab, and mounts through a rubber cushioned torsion bushing 36 on each upright 32 to provide vibration isolation for the cab on both sides of the cab 16 at the front supports for the cab.

Figure 4:
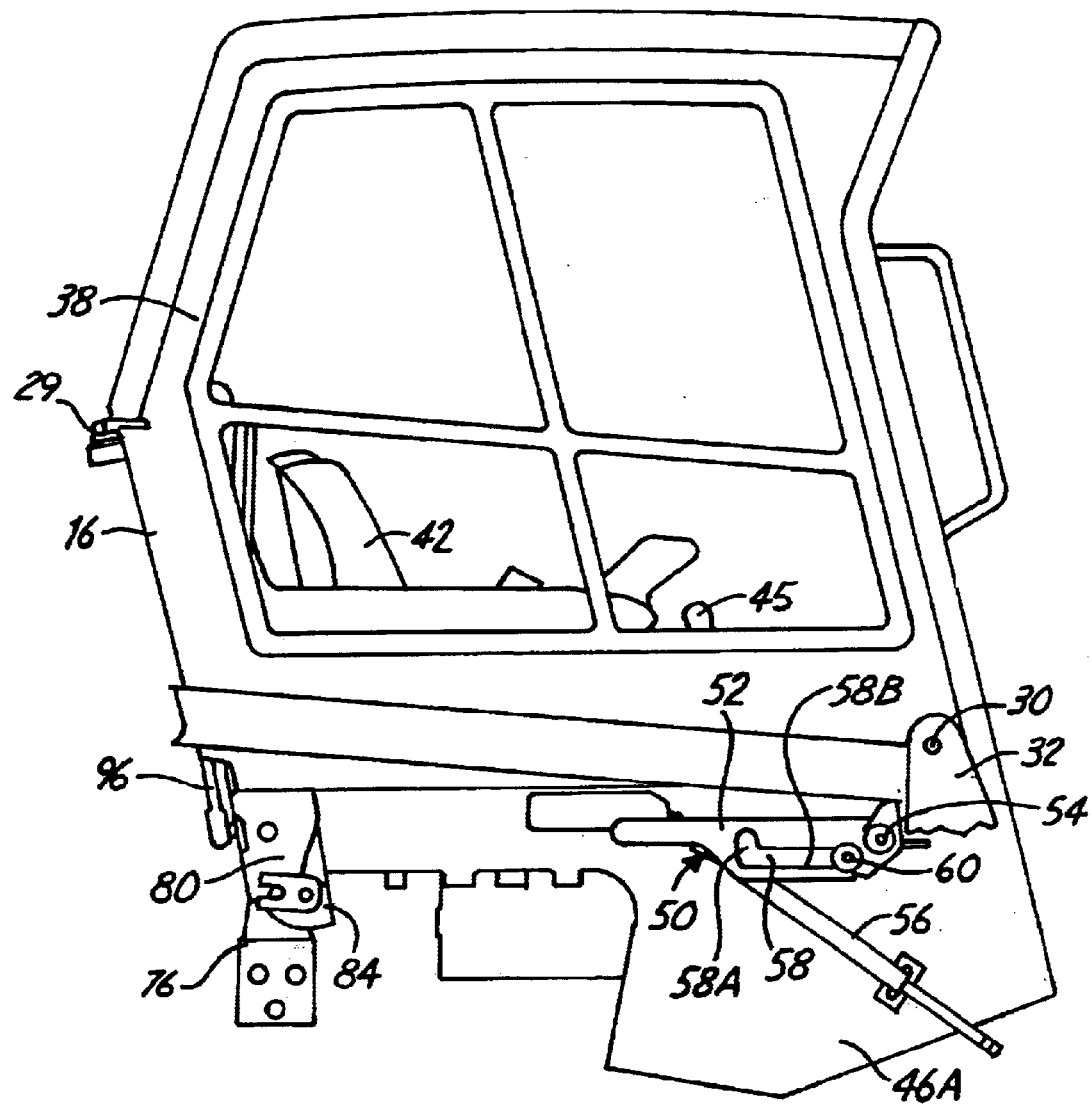
FIG. 4 is a view of the cab, by itself, to illustrate a foot pod and the positioning of a no tool cab latch, and showing the cab stop assembly.
Figure 5:
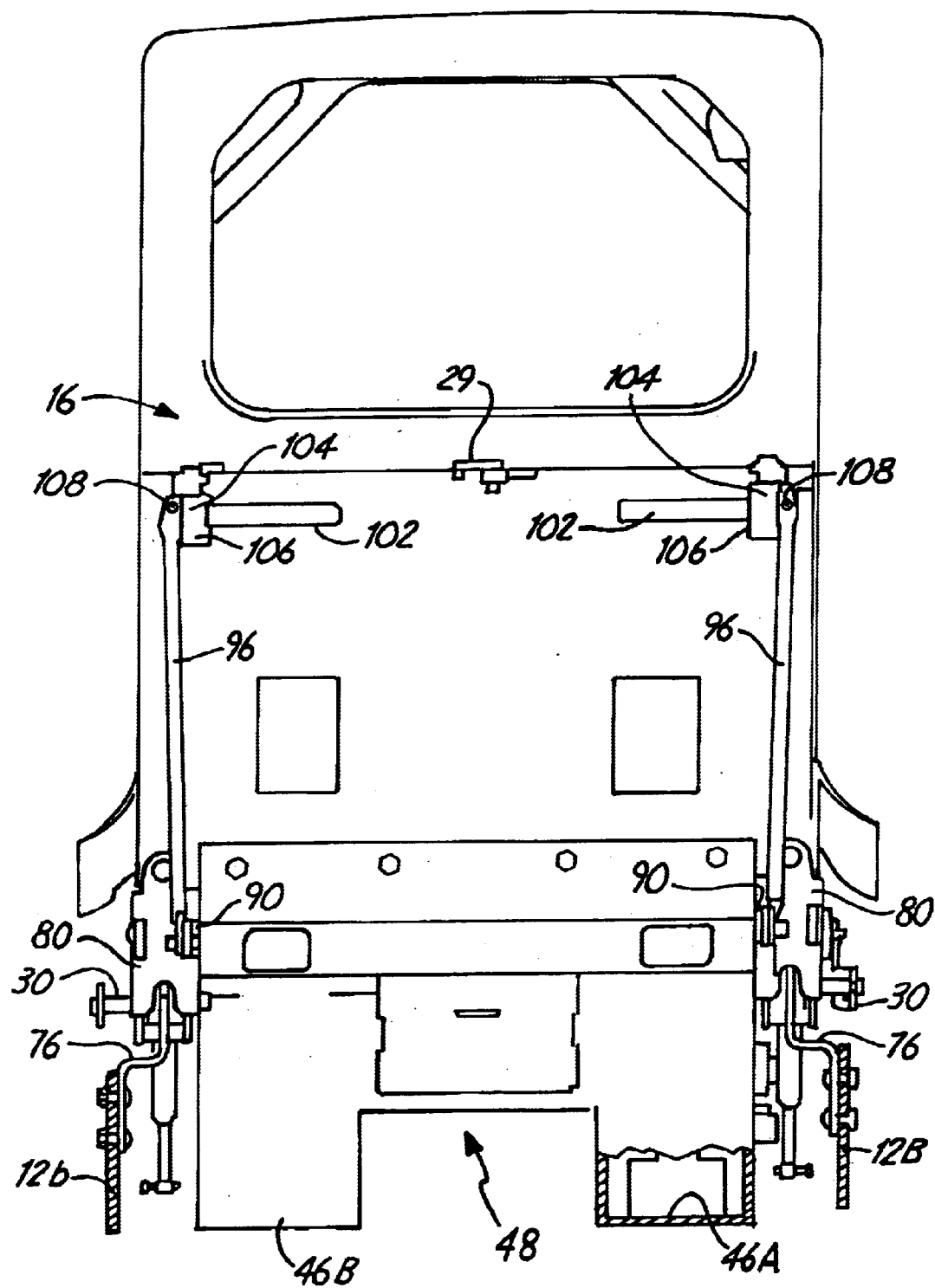
FIG. 5 is a rear view of the cab assembly shown in FIG. 4.
Figure 6:
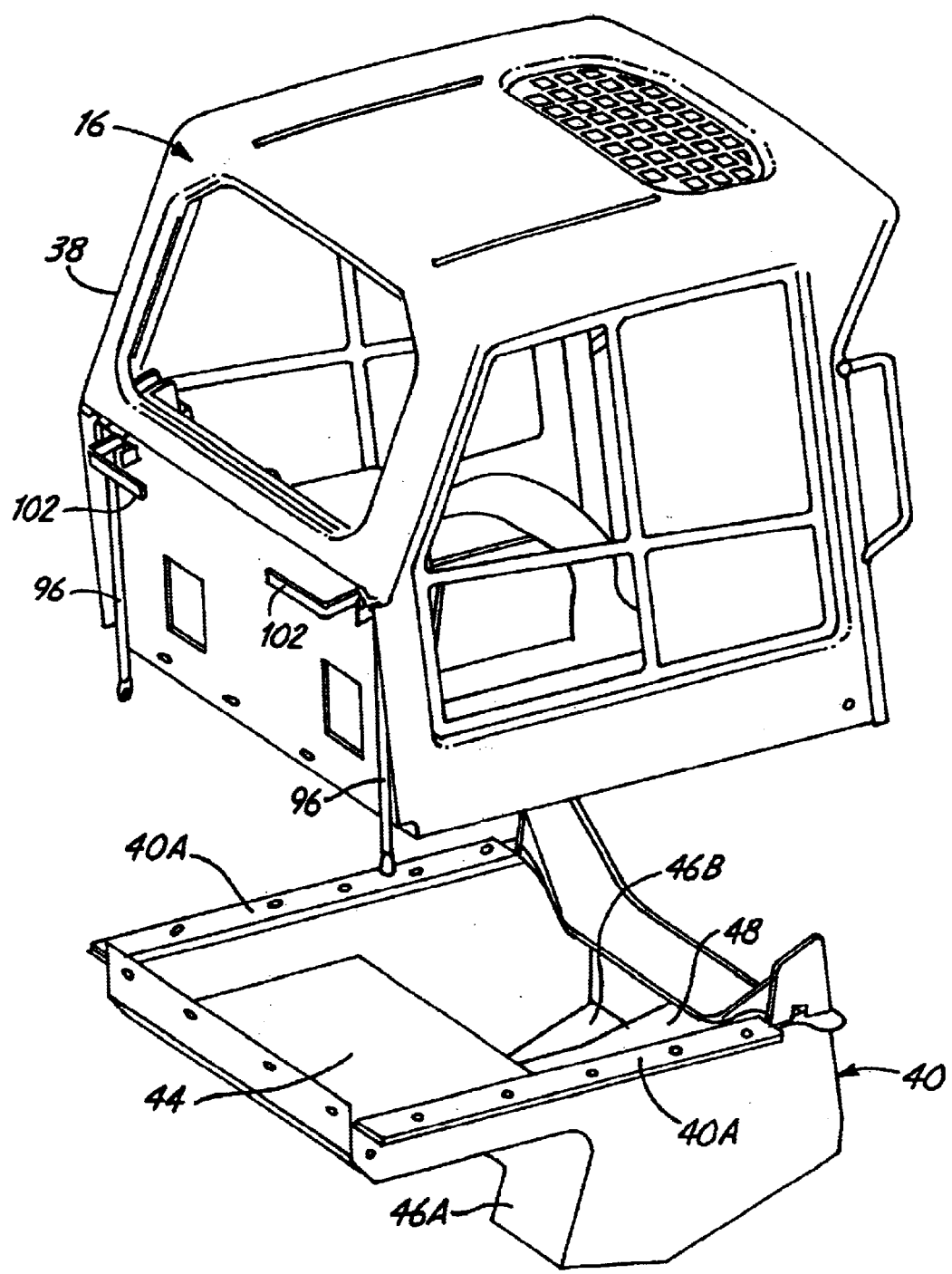
FIG. 6 is an exploded perspective view of the cab showing it in its major components, and illustrating a foot pod that is used on the lower portion of the cab for lowering the operator's seat level.

The cab structure, shown in greater detail in FIGS. 4, 5, and 6. The cab has an upper operator enclosure 38, with side windows and a front access door. FIG. 2 shows alternative mesh side walls for the cab. The cab also has a front, dropped foot pod section made as a formed pod section 40, that is attachable to the upper operator enclosure 38 in which the operator seat shown at 42 is mounted. The upper operator section 38 has internal flanges at the bottom of the cab walls for mounting a floor plate 44 illustrated is a headliner that forms a support for the seat 42. The foot pod 40 has an upper edge flange 40A that is attachable to the lower edge flange of the upper operator's cab section 38. The foot pod section 40 is open upwardly and opens to the interior of the upper operator's cab section 38. When an operator is in the cab and seated on the seat 42 the operator's feet are placed in a pair of depending foot pockets 46A and 46B, perhaps best seen in FIG. 5. There is a raised recess 48 in the center between the foot pockets that is used for clearing necessary component mounted on the frame 12. The operator's feet will rest on the bottom or floor walls of the pods 46A and 46B, while the operator is seated on the seat 42. The operator seat 42 thus can be kept lower, while providing adequate leg room and space in the pod 40 for the operator's legs and feet.

The foot pod can be deep formed metal plastic or fiberglass. The flange 40A is bolted to a, flange at the bottom edge of the walls of the cab section 38.

The ground control for the skid steer loader may be a joystick control such as that shown at 45. The controls pivot or move with the cab.

The foot pod which is mounted below the base panel of the cab does not interfere with forward pivoting, and swings into space that is occupied by the pod during use.

Figure 7:
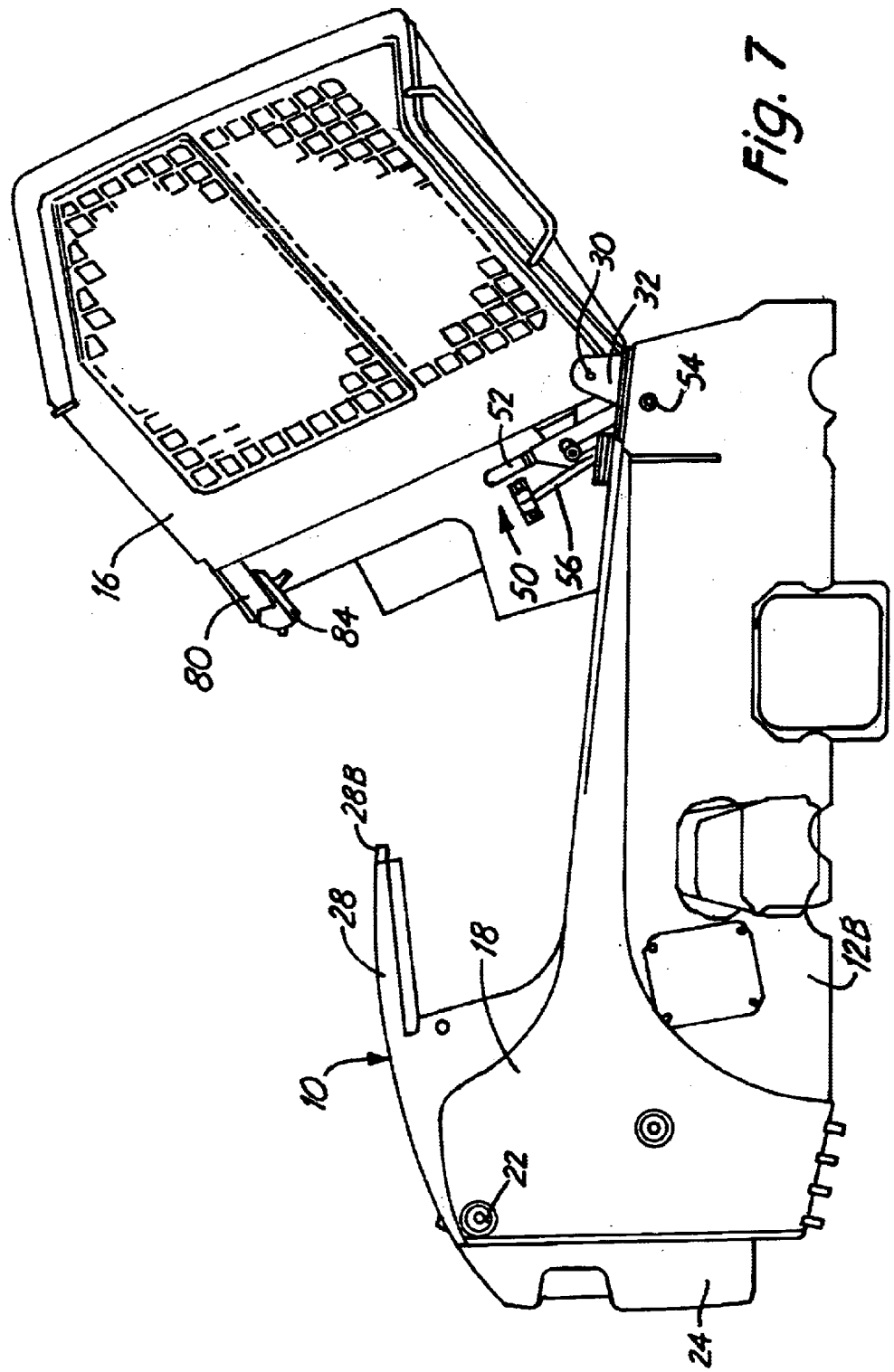
FIG. 7 is a schematic side elevational side of a frame assembly with the cab in a fully open pivoted position, and the cab stop after manual movement needed to unlock the cab and lower from its open position.

The cab 16 is latched in working position, and when it is tilted forwardly as shown in FIG. 7 for example, it is retained by an automatic cab stop that is manually releasable. The cab stop can be mounted on only one side of the cab and stops or locks the cab in an open position. The cab stop is indicated generally at 50 in FIG. 7, and is shown in greater detail in FIGS. 8 and 10 and in an exploded view in FIG. 9.

The cab stop 50 includes a manual stop handle or lever 52, which also will automatically raise during tilting or pivoting of the cab. The handle 52 is pivotally mounted on a pivot 54 comprising a pin that is fixed to the side wall of the upper frame assembly 12B. When the latches for the cab, which are at the rear of the cab, and which will be explained in detail, are released, the cab can be tilted or pivoted forwardly. The forward tilting is assisted with a gas spring 56 on each side of the cab, and referring specifically to FIG. 10, the cab stop manual handle 52 is provided with a longitudinal guide slot 58. A pin 60 is mounted onto a bracket 62 that is fixed to the flange on the bottom of the cab .16 that supports the foot pod 40. The pin 60 slidably fits into the slot 58 in the handle 52. The slot 58 has a main longitudinal slot portion 58B and a recess portion 58A. As the cab pivots, the pin 60 will cause the handle 52 to pivot on its pivot 54, which is shown in FIG. 10, as well, against the action of a torsion spring 64 that tends to urge the handle or lever 52 in a counter-clockwise direction.

Figure 10:
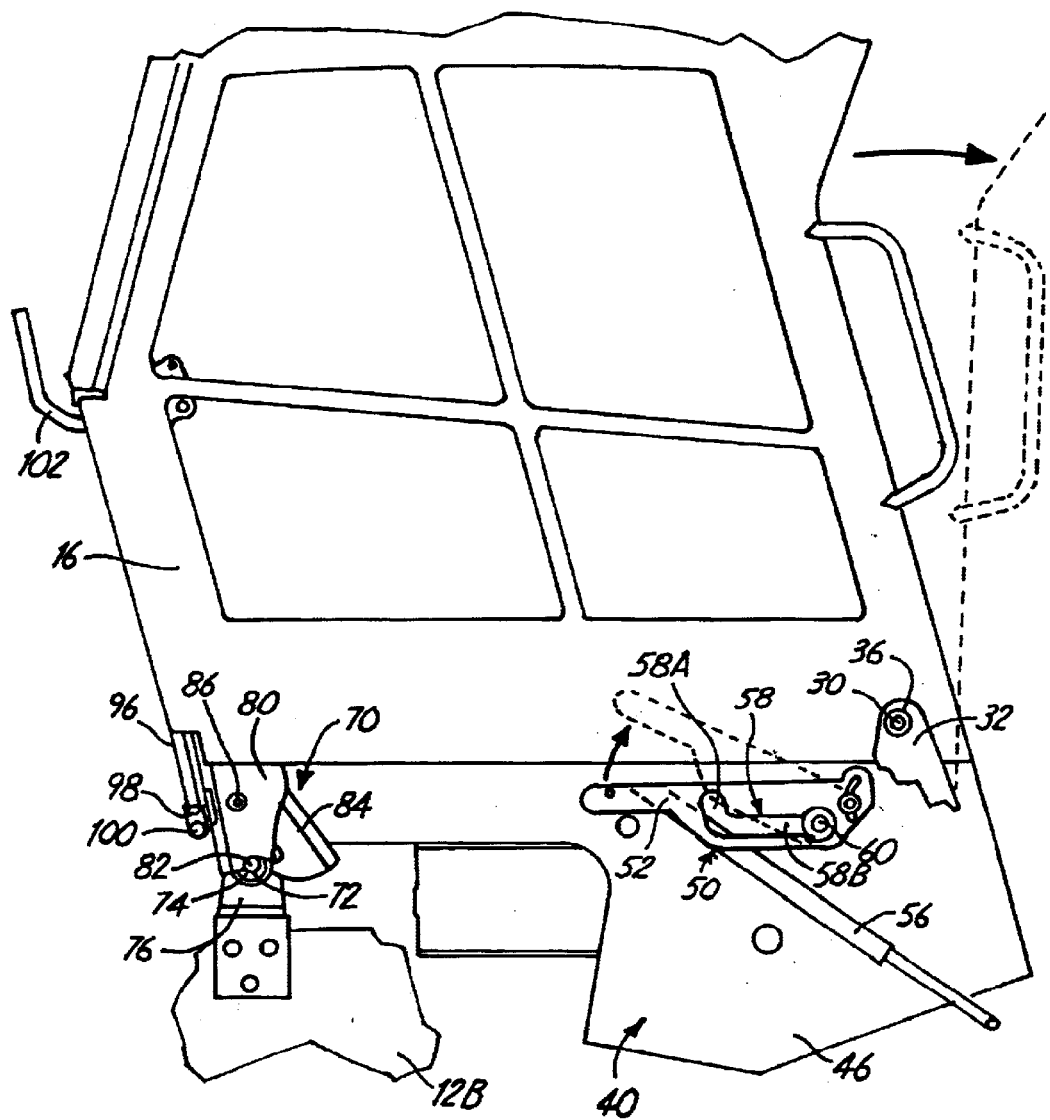
FIG. 10 is a side elevational view of a cab showing the cab in a lowered position, but before the cab latch has been locked to hold the cab in its working position.

The cab 16 rotates in clockwise direction to its open position as shown in FIGS. 7 and 10. The bracket 62 will also rotate about its pivot, which is spaced from the cab pivot, so the pin 60 will ride along the main slot portion 58B. The lever 52 will pivot to the position shown in FIG. 7, where the pin 60 is shown at the end of the main portion 58B of the slot, and aligned with a lock recess 58A at the outer end of the slot.

Figure 8:
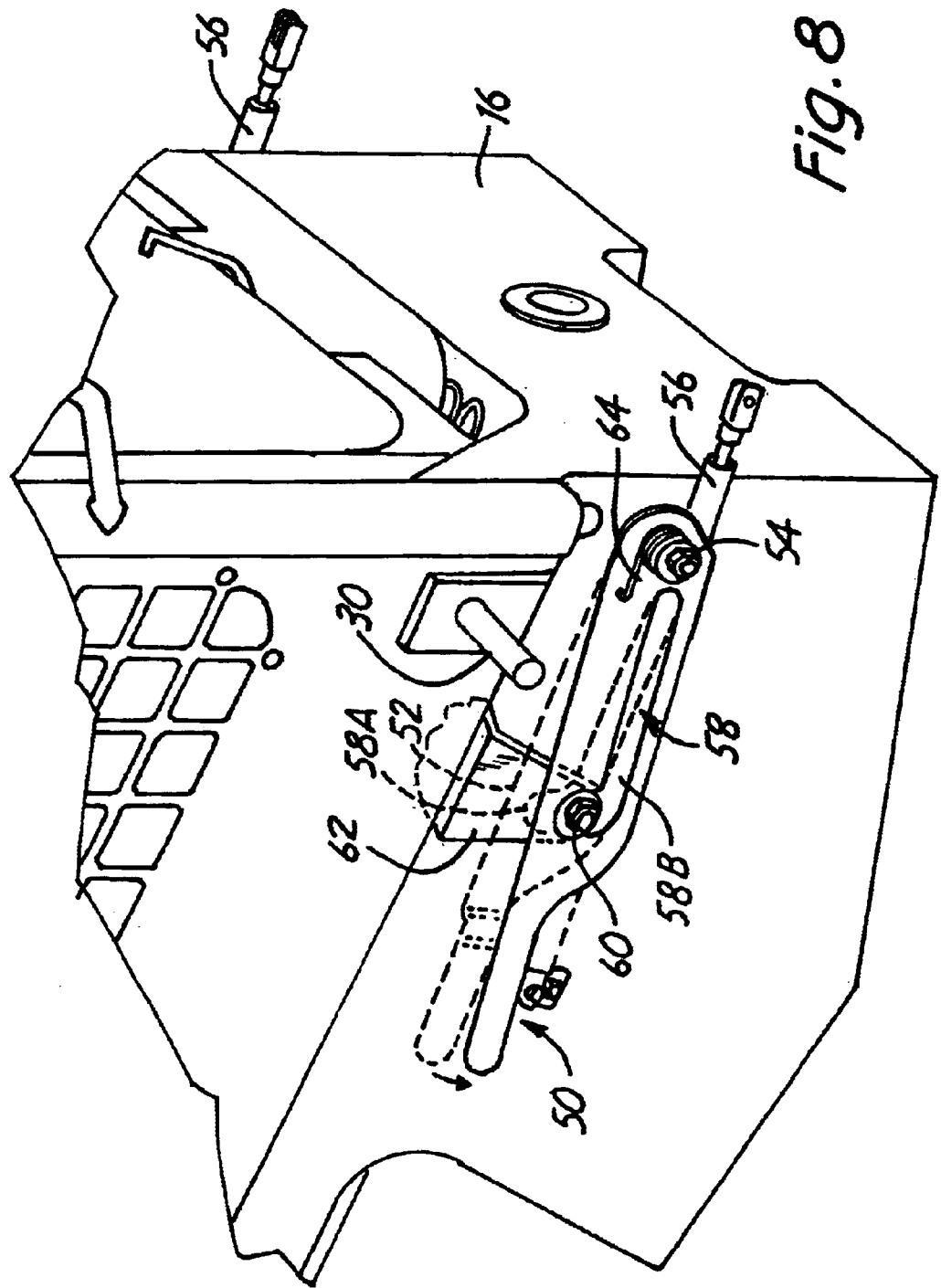
FIG. 8 is a perspective view of a portion of the cab showing the stop of FIG. 7, in its locked position holding the cab in its forwardly pivoted position with part removed for sake of clarity.

The cab 16 will be tilted all the way forward at this position, and can be stopped against a stop if desired, but the pin 60 will be stopped at the outer end of the slot main portion 58B. Then the handle 52 will be moved in counter-clockwise direction, or downwardly, to move the recess 58A around the pin 60, so that the handle will then be in a locked position as shown in FIG. 8. The pin will be retained in the recess 58A by the action of the torsion spring 64, which has one end anchored on the lever or arm 52, and the other end anchored on the frame section 12B. The handle or lever 52 will tend to move counter-clockwise automatically to move the recess 58A around the pin 60, under the spring urging. The handle or lever 52 can be manually moved to assure that the cab stop is fully engaged, to prevent the cab from moving in counter-clockwise direction toward its closed direction.

When the cab 16 is to be returned to its working or closed position, the handle or lever 52 will be moved manually to the position shown in FIG. 7, with the pin 60 aligned with the main portion 58B of the slot 58, and the cab then can be rotated down by a manual force against the action of the gas springs 56, until the cab reaches its down or working position.

Figure 9:
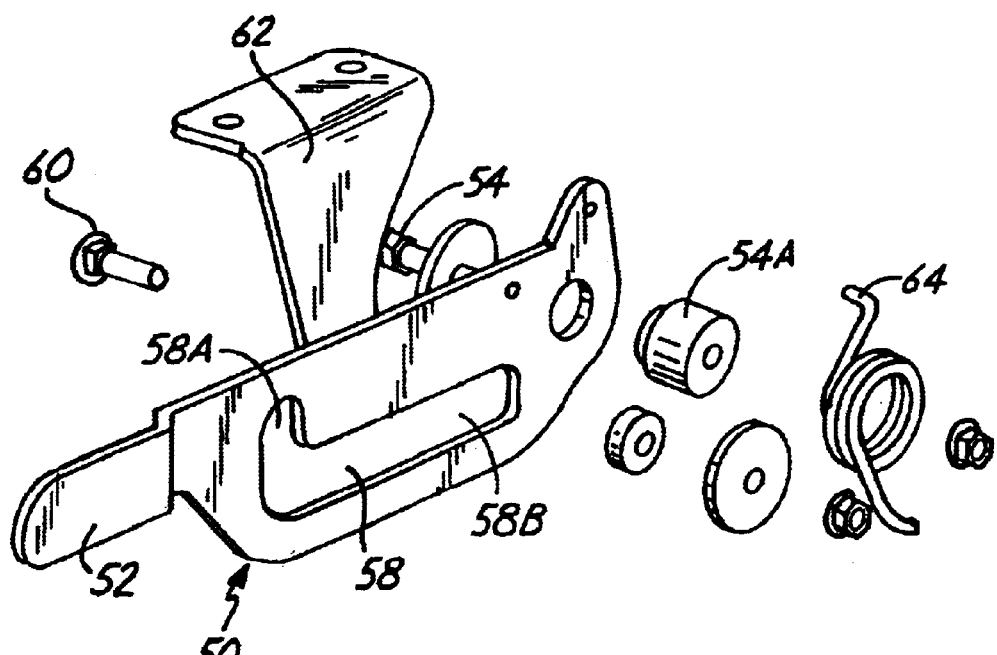
FIG. 9 is an exploded view of the components of the cab stop shown in FIGS. 7 and 8.

The parts of the cab stop that mount onto the cab walls are shown in FIG. 9 in an exploded view, and it can be seen that the lever 52 is supported on a bushing 54A, at the pivot pin 54, for ease of movement.

As shown in FIG. 10, the cab 16, when it is in its working position, is latched securely from forward pivoting movement with latch assemblies 70, one on each rear corner of the cab. Each latch assembly 70 is a no tool latch, which means it can be operated (released or secured) without having any tools at all. The pair of latches is manually and positively operated with a hand lever. The latches are carried on the cab, and they anchor to an aligning pair of pins 72 that are mounted in rubber torsion bushings 74. The bushing 74 in turn are supported on brackets 76 that are fixed to the frame section 12B. Only one latch will be described, but two latches are used, one at each corner. When a latch on the cab is secured to the respective pin 72 the torsion bushing 74, which is elastomeric, provides vibration and shock isolation for the cab. The mounting of the torsion bushing 74 is perhaps best seen in FIG. 15. The bracket 76 has an offset section so that it provides for clearance for the pin 72 on opposite sides of the torsion bushing 74, and the bushing holder or ring 78 at the upper end of the bracket 76 holds the torsion bushing in place.

Each pin 72, which can be called a lock pin, is thus secured in a known location on the frame in relation to the pivot axis of the cab so the latches will reliably engage its pins. As the cab is lowered, with the latch held in an open position as shown in FIG. 10, the respective cab latch frame 80, which is secured to the bottom side of the cab at a rear corner moves, to engage the respective pin 72. The latch frame 80 is a channel shape section. The frame 80 has side walls with lower edges configured to have recesses at 82 that will engage and rest on the ends of the pin 72.

Figure 11:
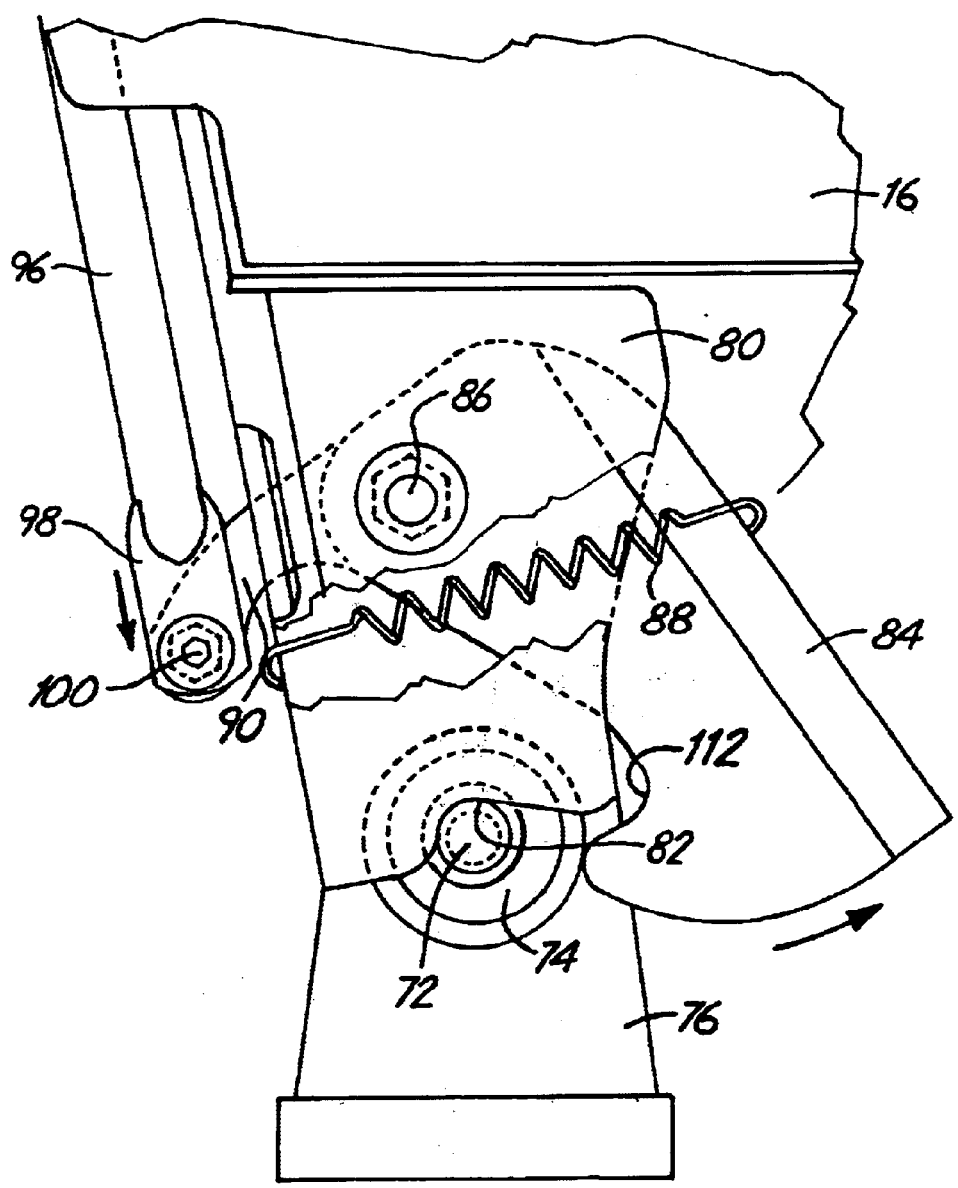
FIG. 11 is an enlarged view of the cab latch shown in the position of FIG. 10.
Figure 12:
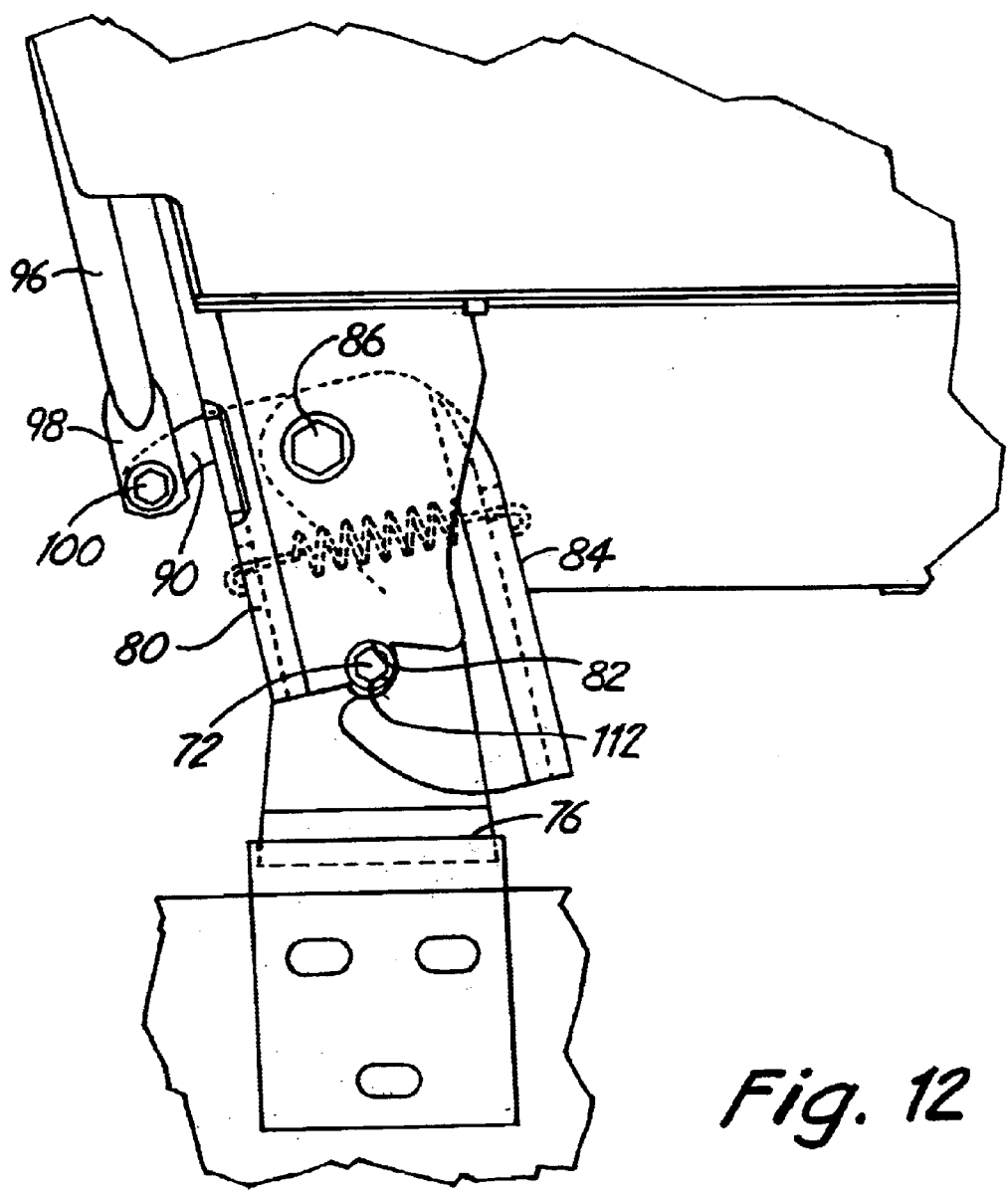
FIG. 12 is a view of the cab latch of FIG. 11 in its locked position to hold the cab in its working position.

The latch dog 84 is pivotally mounted to the latch frame 80 on a pivot pin 86 that spans the legs of the channel shaped latch frame 80, and the latch dog 84 is urged in a direction toward the pin 72 (or toward the rear of the cab) with a spring 88 (See FIGS. 11 and 15).

The latch dog 87 has an arm 90, that extends rearwardly through a slot 92 in the base of the latch frame 80, as seen in FIG. 15. The arm 90 protrudes to the rear of the latch frame 80. The latch dog 84 is operated to pivot by manually, and positive mechanical connection to the arm 90. A connecting rod 96 is connected through a strap 98 to a pivot pin 100 at the outer end of the arm 90, and movement of the connecting rod will control pivoting of the latch dog 84 about the pivot pin 86.

Figure 13:
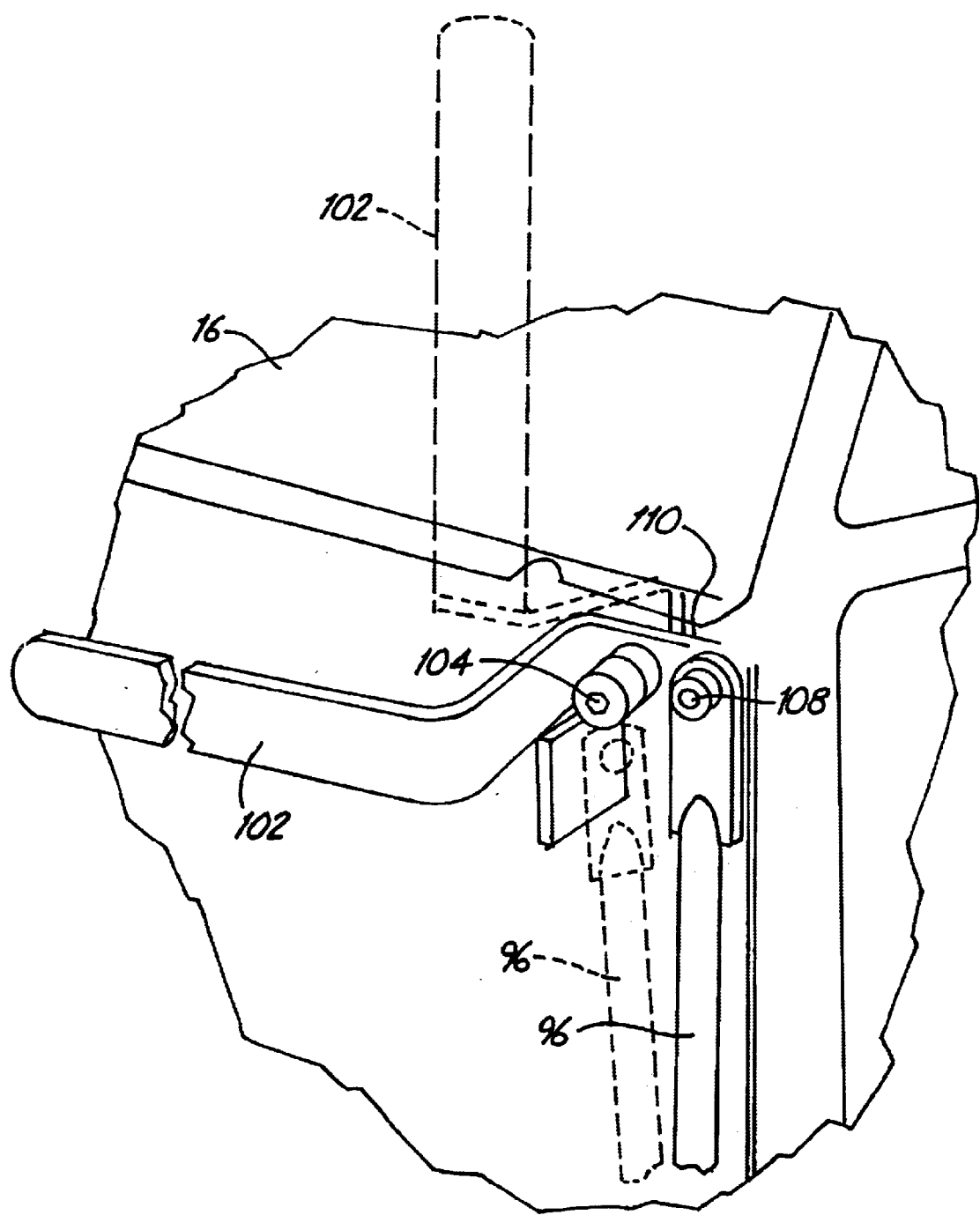
FIG. 13 is a perspective view of a manual cab latch lever handle showing the lever handle in solid lines in its latched position, and in dotted lines in an unlatched position.

The connecting rod 96 is operated manually without tools, by moving a pivoting handle 102 that is supported on a bracket at the rear of the cab just below the rear window of the cab, (one on each side of the cab) and the pivoting lever is shown in perspective view in FIG. 13. The lever has a manual handle 102 and is shown in its unlatched position in FIG. 13 in dotted lines, and in its latched position in solid lines. It can be seen that the lever handle 102 is offset so that it provides hand clearance with the back panel of cab 16, and is pivotally mounted on a pin 104 that is supported on a bracket 106 which in turn is attached to the back of the cab. The bracket 106 has an outwardly extending, leg which can provide a stop against pivoting beyond the dotted line position. When the lever handle is pivoted up, the connecting rod 96 will be lowered, to move the latch dog to its position shown in FIG. 11, against the action of spring 88.

The connecting rod 96 is pivotally mounted with a pin 108 to an outer end of an actuator portion 110 of the lever handle 102, and when the lever handle 102 is moved to its dotted line position, the axis of the pin 108 will move at an opposite side of the plane passing through the axes of the pin 104 and the point of connection at the lower end of the connecting rod to the arm 90, so that it is essentially over center. The force from the spring 88 will put an upward force on the connecting rod to hold the lever 102 in its latch open position. In other words, the lever 102 will not then tend to pivot to close the latch dog, whenever the cab is pivoted to its open position. The latch dog thus is kept in its ready position while the cab is away from its working position.

The position of the lever handle 102 in its closed position is shown in FIG. 14 as well, and in dotted lines in FIG. 14, it is seen that the pivot pin 108 is on the opposite side of the plane that passes through the pivot pin 104 and the point of attachment of the lower end of the connecting rod to the latch dog actuator pin 100.

When the lever handle 102 is moved to its locked position, the connecting rod 96 is lifted, and the latch dog 84 will pivot about the pin 86 so that a recess 112 in the edge of the side arms of the latch dog will engage opposite end portions of the latching pin 72. The lever handle 102 and the pivot points move to its solid line position shown in FIG. 13, and the connecting rod then closes the latch dog onto the pin 72.

Figure 16:
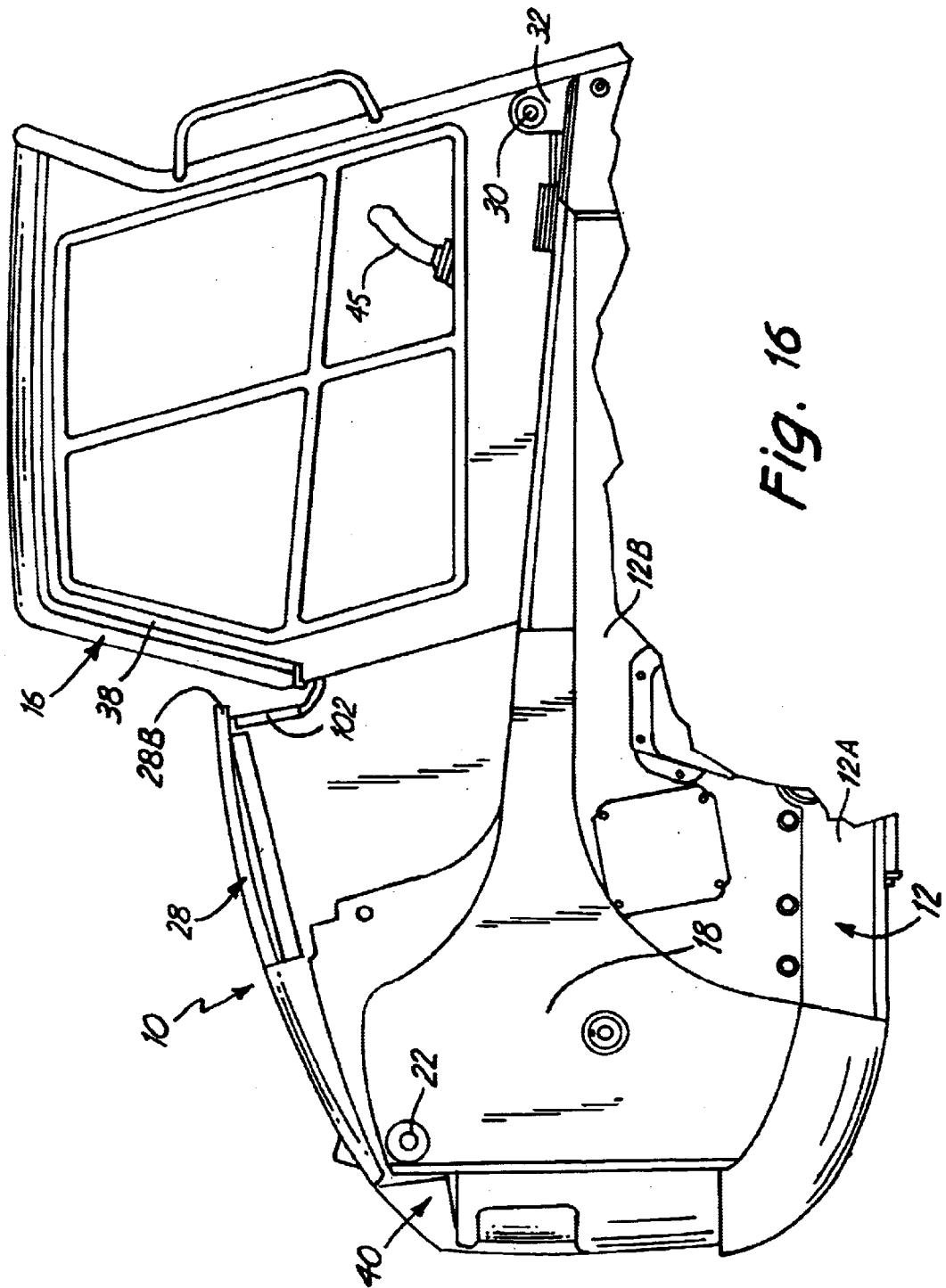
FIG. 16 is a fragmentary illustrative view showing a no tool cab latch lever in an unlatched position wherein it interferes with an engine compartment cover.

The lever handles 102 are held in place and will not move to unlatched position when the engine cover is secured, with its front edge latched into a cover latch that is positioned on the back wall of the cab. However, if one or both of the lever handles 102 is forgotten in an unlatched position, as shown in FIG. 16, the engine cover 28 cannot close. The lever handle 102 will interfere with the front edge of the engine cover and it will be propped open. This will remind the operator that the cab latch dog 84 is not secured, and that thus the operator will not start operating the cab without having the cab 16 securely locked in its working position. Also, if the lever handles 102 have been moved to the latched position, but the cab 16 is not actually in its working position, but perhaps resting on the top of the pin, the engine cover 28 cannot be latched on latch 29.

Although the present invention has been described with reference to preferred embodiments, workers skilled in the art will recognize that changes may be made in form and detail without departing from the spirit and scope of the invention.

What is claimed is:

1. A loader having a loader frame, support wheels for supporting the frame for movement along a supporting surface, an operator's cab mounted on said loader frame, a pivot support on the frame at a forward portion of the operator's cab for pivotally mounting the operator's cab for movement between a working position, and a forwardly pivoted open position, and a cab stop for holding the cab in its forward pivoted position comprising a lever pivotally mounted relative to the frame about a pivot axis different from the pivot axis of the cab, the lever having a slot along the length thereof, a pin fixed on the cab and positioned in the slot for sliding movement when the cab pivots between its working and open positions, and a receptacle extending to one side of the slot and open to the slot for receiving the pin when the cab is in its open position, said receptacle preventing the pin from sliding along a main portion of the slot.

2. The loader of claim 1, and a spring mounted for urging the lever in a direction to cause the receptacle to move over the pin when the pin aligns with the receptacle.

3. The loader of claim 1, wherein the pivot support comprises a pair of pivot supports, each fixed on an opposite side of the cab forming the pivotal mounting of the cab, and an elastomeric bushing on each of the pivot supports on each side of the frame for mounting pivot pins on the cab relative to the frame.

4. A loader having a loader frame, support wheels for supporting the frame for movement along a supporting surface, an operator's cab mounted on said loader frame, a pivot support adjacent forward edges of the frame and at a forward portion of the operator's cab for pivotally mounting the operator's cab for movement between a working position, and a forwardly pivoted open position, the frame having spaced apart side members between which the cab is mounted, a cab floor at a lower edge of the cab extending to a forward edge, said cab floor supporting an operator's seat, and a foot compartment at a forward portion of the cab dropped below the cab floor and fitting between the side members of the frame, said foot compartment having a pair of spaced receptacles adjacent opposite sides of the cab, and a raised center portion between the receptacles.

5. A loader having a loader frame, support wheels for supporting the frame for movement along a supporting surface, an operator's cab mounted on said loader frame, a pivot support on the frame at a forward portion of the operator's cab for pivotally mounting the operator's cab for movement between a working position, and a forwardly pivoted open position, said cab having at least one latch on a rear portion thereof, and adjacent a lower edge of the cab, said latch including a latch frame mounted on the cab and movable therewith, and carrying a latch dog, a latch pin mounted on the loader frame, said latch dog engaging the latch pin when manually moved in a direction toward the latch pin with the cab in its working position, a latch lever movably mounted on the cab, a connecting rod connected between the latch lever and the latch dog, the latch dog being pivotally mounted on the latch frame and moved to its latched position when the latch lever is manually moved to a latched position.

6. A cab for a work vehicle having a frame, a support on the frame for pivotally mounting the cab, the cab including an operator's compartment, a floor for supporting an operator's seat, and a foot compartment supported on the cab forwardly of the floor, and within the cab, and having a lower floor wall at a level substantially below the floor to permit lower legs and feet of an operator seated in the seat to be below the floor, wherein the foot compartment is divided into two laterally spaced sections, and a raised wall between the laterally spaced sections on the interior of the cab that is raised above the lower floor wall.

7. The cab of claim 6, wherein the space below the raised wall and between the spaced lateral sections is unobstructed.

8. The cab of claim 6, wherein, the support is adjacent to a forward end of the frame and the cab is pivotally mounted on the support at a forward end of the cab and positioned so upper portions of the cab pivot in a forward direction from a working position wherein an operator seated in the cab can control a loader on which the cab is mounted.

9. A loader having a frame, the frame having a forward end and rearward end, an operator's cab mounted on the frame, and pivotally mounted about a generally horizontal axis adjacent the forward end of the frame, said cab being pivotable forwardly so that a rear portion of the cab raises from the frame as the cab is moved toward an open position, an engine and accessory compartment behind the cab on the frame, a cover which hinges at a rear portion extending forwardly to cover the compartment and wherein a forward edge of the cover is adjacent to the rear portion of the cab when the cab is in a working position, and a latch lever for operating a cab latch to hold the cab in its working position, said latch lever being at a level on a rear wall of the cab such that in an open position of the lever and the cab latch, the forward edge of the cover is stopped by the lever before the cover reaches a closed position.

10. The loader of claim 9, wherein said lever is movable to a latched position to hold the cab in its closed position, and the cover being closeable with the lever in its closed position.

11. The loader of claim 10, and an cover latch on a rear wall of the cab, said cover latch being in position to receive the forward edge of the cover only when the lever is in its closed position.

* * * * *